United States Patent
Kono et al.

(10) Patent No.: US 12,331,138 B2
(45) Date of Patent: Jun. 17, 2025

(54) METHOD FOR PRODUCING CATALYST FOR OLEFIN POLYMERIZATION

(71) Applicant: TOHO TITANIUM CO., LTD., Chigasaki (JP)

(72) Inventors: Hiroyuki Kono, Chigasaki (JP); Takahiro Masuyama, Chigasaki (JP); Shinta Marui, Chigasaki (JP); Toshiya Uozumi, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 0 days.

(21) Appl. No.: 15/773,278

(22) PCT Filed: Oct. 28, 2016

(86) PCT No.: PCT/JP2016/082094
§ 371 (c)(1),
(2) Date: May 3, 2018

(87) PCT Pub. No.: WO2017/090377
PCT Pub. Date: Jun. 1, 2017

(65) Prior Publication Data
US 2019/0023820 A1    Jan. 24, 2019

(30) Foreign Application Priority Data
Nov. 24, 2015 (JP) .................. 2015-228708

(51) Int. Cl.
*C08F 110/06* (2006.01)

(52) U.S. Cl.
CPC ........ *C08F 110/06* (2013.01); *C08F 2410/00* (2013.01)

(58) Field of Classification Search
None
See application file for complete search history.

(56) References Cited

U.S. PATENT DOCUMENTS

| | | | | |
|---|---|---|---|---|
| 2005/0176900 A1* | 8/2005 | Zhu | .......................... | C08F 10/00 526/124.3 |
| 2014/0316069 A1* | 10/2014 | Galvan | .................. | C08F 10/06 525/240 |
| 2014/0343237 A1* | 11/2014 | Sugano | .................. | C08F 10/00 526/123.1 |
| 2016/0009836 A1 | 1/2016 | Sugano et al. | | |

FOREIGN PATENT DOCUMENTS

| | | | |
|---|---|---|---|
| CN | 1957034 | A | 5/2007 |
| CN | 103764689 | A | 4/2014 |
| CN | 104558287 | A | 4/2015 |
| CN | 105008407 | A | 10/2015 |
| EP | 0719798 | A1 | 7/1996 |
| EP | 2829397 | A1 | 1/2015 |
| JP | 57-63310 | A | 4/1982 |
| JP | 6-56924 | A | 3/1994 |
| JP | 6-80719 | A | 3/1994 |
| JP | 8-231633 | A | 9/1996 |
| JP | H08-231633 | A | 9/1996 |
| JP | 10-120719 | A | 5/1998 |
| JP | 2000-336130 | A | 12/2000 |
| JP | 2009-167431 | A | 7/2009 |
| JP | 2012-77276 | A | 4/2012 |
| KR | 20150124943 | A | 11/2015 |
| KR | 20150125664 | A | 11/2015 |
| WO | WO 2013042400 | * | 3/2013 |

OTHER PUBLICATIONS

Extended (Supplementary) European Search Report dated Jul. 2, 2019, issued in counterpart EP application No. 16868326.6 (8 pages).
International Search Report dated Jan. 31, 2017, issued in counterpart International Application No. PCT/JP2016/082094 (2 pages).
Office Action dated Dec. 12, 2019, issued in counterpart TW Application No. 105136618, with partial English translation. (5 pages).

(Continued)

*Primary Examiner* — Yun Qian
(74) *Attorney, Agent, or Firm* — WHDA, LLP

(57) ABSTRACT

It is intended to provide a method for producing a catalyst for olefin polymerization which exhibits excellent catalytic activity in a polymerization treatment and permits production of a polymer excellent in stereoregularity, melt flowability, etc., even when the polymerization catalyst is prepared in an inert gas atmosphere by using a solid catalytic component comprising an electron-donating compound other than a phthalic acid ester. The method for producing a catalyst for olefin polymerization comprises performing a pre-contact treatment of bringing a solid catalytic component (A) comprising a magnesium atom, a titanium atom, a halogen atom and an electron-donating compound having no phthalic acid ester structure, a specific organoaluminum compound (B) and an external electron-donating compound (C) into contact with each other at a temperature of lower than 15° C. for a time of 30 minutes or shorter in the absence of the olefin.

5 Claims, No Drawings

(56) References Cited

OTHER PUBLICATIONS

Office Action dated Feb. 5, 2021, issued in counterpart Chinese patent application No. 201680067198.2 (18 pages, w/ English translation).
Office Action dated Jul. 19, 2021, issued in counterpart Chinese patent application No. 201680067198.2 (13 pages, w/ English translation).
Office Action dated Jul. 11, 2023, issued in counterpart KR Application No. 10-2018-7016020, with English translation. (19 pages).
Office Action dated May 20, 2024, issued in counterpart KR Application No. 10-2018-7016020, with English translation. (10 pages).

* cited by examiner

METHOD FOR PRODUCING CATALYST FOR OLEFIN POLYMERIZATION

TECHNICAL FIELD

The present invention relates to a method for producing a catalyst for olefin polymerization.

BACKGROUND ART

Heretofore, solid catalysts consisting of a transition metal catalytic component such as titanium and a typical metal catalytic component such as aluminum have been widely known as catalysts for olefin polymerization.

The emergence of supported catalysts using a magnesium compound as a support drastically increases the polymerization activity of the catalysts for olefin polymerization. Furthermore, catalysts for olefin polymerization supplemented with an electron donor such as an ester compound also enable polymers with high stereoregularity to be produced from α-olefins having 3 or more carbon atoms.

For example, Patent Literature 1 (Japanese Patent Laid-Open No. 57-63310) has proposed a method for polymerizing propylene using an electron-donating compound (e.g., a phthalic acid ester)-supported solid titanium catalytic component, an organoaluminum compound as a promoter component, and an organosilicon compound having at least one Si—O—C bond. Many literatures, including this patent literature, have proposed a method for obtaining a highly stereoregular polymer at a high yield using a phthalic acid ester as an electron-donating compound.

However, di-n-butyl phthalate and benzyl butyl phthalate, which are included in the phthalic acid ester, are defined as Substance of Very High Concern (SVHC) by the Registration, Evaluation, Authorization and Restriction of Chemicals (REACH) regulation in Europe. Thus, there is a growing demand for shift to catalytic systems using no SVHC substance, from the viewpoint of reduction in environmental load.

Solid catalytic components containing an electron-donating compound, such as a succinic acid ester, a maleic acid ester, a malonic acid ester, or a diether, which is not subject to the SVHC regulation are known.

Citation List

Patent Literature

[Patent Literature 1] Japanese Patent Laid-Open No. 57-63310

SUMMARY OF INVENTION

Technical Problem

Unfortunately, solid catalytic components containing an electron-donating compound that is not subject to the SVHC regulation rarely exert performance equivalent to solid catalytic components containing a phthalic acid ester. The solid catalytic components containing an electron-donating compound that is not subject to the SVHC regulation tend to remarkably reduce activity, particularly, in polymerization facilities involving a process of bringing a solid catalytic component, an organoaluminum compound and an external electron-donating compound into contact with each other in an inert gas atmosphere such as a nitrogen atmosphere. Hence, there is a demand for further improvement.

Under these circumstances, an object of the present invention is to provide a method for producing a catalyst for olefin polymerization which exhibits excellent catalytic activity in a polymerization treatment and permits production of a polymer excellent in stereoregularity, melt flowability, etc., even when the polymerization catalyst is prepared in an inert gas atmosphere by using a solid catalytic component comprising an electron-donating compound other than a phthalic acid ester.

Solution to Problem

The present inventors have conducted diligent studies to solve the technical problems described above and consequently found that the technical problems can be solved by preparing a catalyst for olefin polymerization by performing a pre-contact treatment of bringing a solid catalytic component (A) comprising a magnesium atom, a titanium atom, a halogen atom and an electron-donating compound having no phthalic acid ester structure, a specific organoaluminum compound (B) and an external electron-donating compound (C) into contact with each other at a temperature of lower than 15° C. for a time of 30 minutes or shorter in the absence of the olefin. On the basis of this finding, the present invention has been completed.

Specifically, the present invention provides:
(1) a method for producing a catalyst for olefin polymerization, comprising
   performing a pre-contact treatment of bringing
   a solid catalytic component (A) comprising a magnesium atom, a titanium atom, a halogen atom and an electron-donating compound having no phthalic acid ester structure, an organoaluminum compound (B) represented by the following general formula (I):

$$R^1_p AlQ_{3-p} \qquad (I)$$

wherein $R^1$ is an alkyl group having 1 to 6 carbon atoms, Q is a hydrogen atom or a halogen atom, and p is a real number of $0 < p \leq 3$,
and an external electron-donating compound (C)
   into contact with each other at a temperature of lower than 15° C. for a time of 30 minutes or shorter in the absence of the olefin;
(2) the method for producing a catalyst for olefin polymerization according to (1), wherein the electron-donating compound is a compound having one or more groups selected from an ester group, a carbonate group and an ether group;
(3) the method for producing a catalyst for olefin polymerization according to (1), wherein the electron-donating compound is at least one compound selected from a succinic acid diester, a malonic acid diester, a maleic acid diester, a cyclohexenecarboxylic acid diester, an ether carboxylic acid ester, a dicarbonate, and a carbonate-ether;
(4) the method for producing a catalyst for olefin polymerization according to (2), wherein the electron-donating donating compound is at least one compound selected from a succinic acid diester, a malonic acid diester, a maleic acid diester, a cyclohexenecarboxylic acid diester, an ether carboxylic acid ester, a dicarbonate, and a carbonate-ether;
(5) the method for producing a catalyst for olefin polymerization according to (1), wherein the treatment temperature of the pre-contact treatment is −15° C. to 10° C.;

(6) the method for producing a catalyst for olefin polymerization according to (2), wherein the treatment temperature of the pre-contact treatment is −15° C. to 10° C.;

(7) the method for producing a catalyst for olefin polymerization according to (3), wherein the treatment temperature of the pre-contact treatment is −15° C. to 10° C.;

(8) the method for producing a catalyst for olefin polymerization according to (4), wherein the treatment temperature of the pre-contact treatment is −15° C. to 10° C.; and (9) the method for producing a catalyst for olefin polymerization according to any of (1) to (8), wherein the treatment time of the pre-contact treatment is 5 seconds to 20 minutes.

Hereinafter, the solid catalytic component (A) comprising a magnesium atom, a titanium atom, a halogen atom and an electron-donating compound having no phthalic acid ester structure is appropriately referred to as a solid catalytic component (A) or a solid catalytic component.

Advantageous Effects of Invention

According to the present invention, a solid catalytic component (A) comprising a magnesium atom, a titanium atom, a halogen atom and an electron-donating compound having no phthalic acid ester structure, a specific organoaluminum compound (B) as a promoter, and an external electron-donating compound (C) are brought into contact with each other at a low temperature for a short time in the absence of an olefin, before contact with the olefin, in an inert gas atmosphere. This is considered to improve the effect of the specific organoaluminum compound (B) on the electron-donating compound (c) while suppressing the inactivation of the catalytic active site, so that the solid catalytic component can be optimally activated. Therefore, the present invention can provide a method for producing a catalyst for olefin polymerization which exhibits excellent catalytic activity in a polymerization treatment and permits production of a polymer excellent in stereoregularity, melt flowability, etc., even when the polymerization catalyst is prepared in an inert gas atmosphere by using a solid catalytic component comprising an electron-donating compound other than a phthalic acid ester.

DESCRIPTION OF EMBODIMENTS

The method for producing a catalyst for olefin polymerization according to the present invention comprises performing a pre-contact treatment of bringing a solid catalytic component (A) comprising a magnesium atom, a titanium atom, a halogen atom and an electron-donating compound having no phthalic acid ester structure, an organoaluminum compound (B) represented by the following general formula (I):

$R^1_p AlQ_{3-p}$ (I)

wherein $R^1$ is an alkyl group having 1 to 6 carbon atoms, Q is a hydrogen atom or a halogen atom, and p is a real number of $0<p\leq 3$, and an external electron-donating compound (C)

into contact with each other at a temperature of lower than 15° C. for a time of 30 minutes or shorter in the absence of the olefin.

In the method for producing a catalyst for olefin polymerization according to the present invention, the solid catalytic component (A) is preferably obtained by bringing a magnesium compound (a), a titanium halogen compound (b) and an electron-donating compound (c) having no phthalic acid ester structure into contact with each other.

The magnesium compound (a) is one or more compounds selected from, for example, a magnesium dihalide, a dialkyl magnesium, an alkyl magnesium halide, a dialkoxy magnesium, a diaryloxy magnesium, an alkoxy magnesium halide and a fatty acid magnesium.

Among these magnesium compounds, a magnesium dihalide, a mixture of a magnesium dihalide and a dialkoxy magnesium, and a dialkoxy magnesium are preferred, and a dialkoxy magnesium is particularly preferred. Specific examples thereof include dimethoxy magnesium, diethoxy magnesium, dipropoxy magnesium, dibutoxy magnesium, ethoxymethoxy magnesium, ethoxypropoxy magnesium, and butoxyethoxy magnesium. Among them, diethoxy magnesium is particularly preferred.

The dialkoxy magnesium may be obtained by reacting metallic magnesium with an alcohol in the presence of a halogen-containing organometal.

The dialkoxy magnesium is in a granular or powdery state, and its shape may foe amorphous or spherical. For example, use of a spherical dialkoxy magnesium facilitates obtaining a polymer powder having a more favorable particle shape and a narrower particle size distribution, improves the handleability of a produced polymer powder in polymerization operation, and easily solves problems, such as filter clogging in a polymer separation apparatus, ascribable to fine powders contained in the produced polymer powder.

These dialkoxy magnesiums may be used alone or in combination of two or more.

The spherical dialkoxy magnesium is not necessarily required to be true spherical and may be oval or potato-like in shape. Specifically, the ratio of major axis diameter L to minor axis diameter W (L/W) is preferably 3 or less, more preferably 1 to 2, further preferably 1 to 1.5, for the particle shape.

The dialkoxy magnesium has an average particle diameter of preferably 1 to 200 μm, more preferably 5 to 150 μm.

When the dialkoxy magnesium is spherical, its average particle diameter is preferably 1 to 100 μm, more preferably 5 to 80 μm, further preferably 10 to 60 μm.

As for a particle size, the dialkoxy magnesium preferably has low contents of fine powders and coarse powders and has a narrow particle size distribution.

Specifically, the dialkoxy magnesium preferably has 20% or less, more preferably 10% or less, of 5 μm or smaller particles. On the other hand, the dialkoxy magnesium preferably has 10% or less, more preferably 5% or less, of 100 μm or larger particles.

Its particle size distribution represented by D90/D10 (wherein D90 is a particle diameter at a cumulative particle size of 90%, and D10 is a particle size at a cumulative particle size of 10%) is preferably 3 or less, more preferably 2 or less.

An exemplary method for producing the spherical dialkoxy magnesium as described above is described in, for example, Japanese Patent Laid-Open Nos. 58-4132, 62-51633, 3-74341, 4-368391, and 8-73388.

The titanium halogen compound (b) is not particularly limited and can be one or more compounds selected from, for example, a titanium tetrahalide and an alkoxy titanium halide.

The titanium halogen compound (b) is preferably one compound selected from titanium tetrahalide and alkoxy titanium halide groups represented by the general formula $Ti(OR^2)_iX_{4-i}$ (wherein $R^2$ represents an alkyl group having 1 to 4 carbon atoms, X represents a halogen atom, and i is an integer of 0 or larger and 4 or smaller).

As the titanium halogen compound (b), specific examples of the titanium halide include titanium tetrahalides such as titanium tetrachloride, titanium tetrabromide, and titanium tetraiodide. Specific examples of the alkoxy titanium halide include methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride, and tri-n-butoxy titanium chloride.

Among these titanium halogen compounds (b), titanium tetrahalides are preferred, and titanium tetrachloride is more preferred.

The electron-donating compound (c) having no phthalic acid ester structure, for use as an electron-donating compound in the solid catalytic component (A) is preferably an organic compound that has no phthalic acid ester structure and has one or more groups selected from an ester group, a carbonate group and an ether group.

When the electron-donating compound (c) is a compound having an ester group, compounds having 1 to 3 ester residues are preferred. Examples thereof can include monocarboxylic acid esters having one ester residue, dicarboxylic acid diesters having two ester residues, polycarboxylic acid polyesters having three or more ester residues, ether-carboxylic acid esters having one ester residue and one alkoxy group, diol esters, polyol esters and substituted phenylene aromatic diesters. For example, succinic acid diesters, malonic acid diesters, maleic acid diesters and cyclohexenecarboxylic acid diesters are preferred.

Among those described above, preferred are monocarboxylic acid esters such as acetic acid esters, propionic acid esters, benzoic acid esters, p-toluic acid esters, and anisic acid esters; dicarboxylic acid diesters such as maleic acid diesters, 2,3-dialkylsuccinic acid diesters, benzylidenemalonic acid diesters, cyclohexane-1,2-dicarboxylic acid diesters, 1-cyclohexene-1,2-dicarboxylic acid diesters, 4-methylcyclohexane-1,2-dicarboxylic acid diesters, 3-methylcyclohexane-1,2-dicarboxylic acid diesters, 3,6-diphenylcyclohexane-1,2-dicarboxylic acid diesters, and 3-methyl-6-n-propylcyclohexane-1,2-dicarboxylic acid diesters; ether-carboxylic acid esters such as ethyl 3-ethoxy-2-isopropylpropionate, ethyl 3-ethoxy-2-isobutylpropionate, ethyl 3-ethoxy-2-t-butylpropionate, ethyl 3-ethoxy-2-t-pentylpropionate, ethyl 3-ethoxy-2-cyclohexylpropionate, and ethyl 3-ethoxy-2-cyclopentylpropionate; and diol esters such as 2,4-pentanediol dibenzoate, 3-methyl-2,4-pentanediol dibenzoate, 3-methyl-5-t-butyl-1,2-phenylene dibenzoate, and 3,5-diisopropyl-1,2-phenylene dibenzoate. Particularly preferred can be one or more compounds selected from, for example, diethyl maleate, diethyl benzylidenemalonate, diethyl 2,3-diisopropylsuccinate, diethyl cyclohexane-1,2-dicarboxylate, di-n-propyl cyclohexane-1,2-dicarboxylate, di-n-butyl cyclohexane-1,2-dicarboxylate, ethyl 3-ethoxy-2-isopropylpropionate, ethyl 3-ethoxy-2-t-butylpropionate, ethyl 3-ethoxy-2-t-pentylpropionate, 2,4-pentanediol dibenzoate, 3-methyl-2,4-pentanediol dibenzoate, 3-methyl-5-t-butyl-1,2-phenylene dibenzoate, and 3,5-diisopropyl-1,2-phenylene dibenzoate.

When the electron-donating compound (c) is a compound having a carbonate group, compounds having 1 to 3 carbonate groups are preferred. Examples thereof include carbonate-ethers having one carbonate group and one alkoxy group, carbonate-esters having one carbonate group and one ester residue, compounds having one carbonate group and one carboxyl group, dicarbonates having two carbonate groups, and polycarbonates having three or more carbonate groups. Among them, carbonate-ethers, carbonate-esters and dicarbonates are preferred, and 2-ethoxyethyl methyl carbonate, 2-propoxyethyl methyl carbonate, 2-benzyloxy ethyl phenyl carbonate, and 5-t-butyl-1,2-phenylene diphenyl dicarbonate are particularly preferred.

When the electron-donating compound (c) is a compound having an ether group, compounds having one ether group, compounds having a fluorene structure, and compounds having a diether structure having one or two alkyl groups or cycloalkyl groups having 3 to 7 carbon atoms are preferred. Specifically, the compound having an ether group can be one or more compounds selected from, for example, monoethers such as methyl ether, ethyl ether, propyl ether, butyl ether, and amyl ether; and diethers such as diphenyl ether, 2,2-dialkyl-1,3-dialkoxypropanes, 2,2-dicycloalkyl-1,3-dimethoxypropanes, and 9,9-bis(methoxymethyl)fluorene. Ether carboxylic acid esters and the like are preferred.

Among those described above, 2-isopropyl-2-isobutyl-1,3-dimethoxypropane, 2-isopropyl-2-isopentyl-1,3-dimethoxypropane, and 9,9-bis(methoxymethyl)fluorene are particularly preferred.

The electron-donating compound (c) is preferably at least one or more compounds selected from a succinic acid diester, a malonic acid diester, a maleic acid diester, a cyclohexenecarboxylic acid diester, a dicarbonate, a carbonate-ether and an ether carboxylic acid ester.

The solid catalytic component (A) comprises an electron-donating compound (c) other than a phthalic acid ester. As mentioned later, a catalyst for olefin polymerization is prepared by performing a pre-contact treatment of bringing the solid catalytic compound (A), a specific organoaluminum compound (B) and an external electron-donating compound (C) into contact with each other at a temperature of lower than 15° C. for a time of 30 minutes or shorter in the absence of the olefin. The obtained catalyst for olefin polymerization exhibits excellent catalytic activity in a polymerization treatment and permits production of a polymer excellent in stereoregularity, melt flowability, etc.

The solid catalytic component (A) may contain a polysiloxane.

In this case, the solid catalytic component (A) can be prepared by bringing the aforementioned magnesium compound (a), titanium halogen compound (b) and electron-donating compound (c) having no phthalic acid ester structure, and further, the polysiloxane into contact with each other.

The contact with the polysiloxane can readily improve the stereoregularity or crystallinity of the resulting polymer and furthermore, can readily reduce the content of fine powders in the resulting polymer.

The polysiloxane is a polymer having a siloxane bond (—Si—O bond) in the backbone. The polysiloxane, also generically called silicone oil, means a chain, partially hydrogenated, cyclic or modified polysiloxane that is a liquid or viscous state at ordinary temperature and has a viscosity of 0.02 to 100 $cm^2$/s (2 to 1000 centistokes) at 25° C.

Examples of the chain polysiloxane include dimethylpolysiloxane and methylphenylpolysiloxane. Examples of the partially hydrogenated polysiloxane include methyl hydrogen polysiloxane having a hydrogenation rate of 10 to 80%. Examples of the cyclic polysiloxane include hexamethylcyclotrisiloxane, octamethylcyclotetrasiloxane, decamethylcyclopentanesiloxane, 2,4,6-trimethylcyclotrisiloxane, and 2,4,6,8-tetramethylcyclotetrasiloxane. Examples of the modified polysiloxane include higher fatty acid group-substituted dimethylsiloxane, epoxy group-substituted dimethylsiloxane, and polyoxyalkylene group-substituted dimethylsiloxane. Among them, decamethylcyclopentasiloxane and dimethylpolysiloxane are preferred, and decamethylcyclopentasiloxane is particularly preferred.

The solid catalytic component (A) is preferably prepared by bringing the magnesium compound (a), the titanium halogen compound (b) and the electron-donating compound (c), and optionally, the polysiloxane into contact with each other in the presence of an inert organic solvent.

The inert organic solvent is preferably a solvent that dissolves the titanium halogen compound (b) and does not dissolve the magnesium compound (a) and specifically, can be one or more solvents selected from, for example, saturated hydrocarbon compounds such as pentane, hexane, heptane, octane, nonane, decane, cyclohexane, methylcyclohexane, ethylcyclohexane, 1,2-diethylcyclohexane, methylcyclohexene, decalin, and mineral oil; aromatic hydrocarbon compounds such as benzene, toluene, xylene, and ethylbenzene; and halogenated hydrocarbon compounds such as o-dichlorobenzene, methylene chloride, 1,2-dichlorobenzene, carbon tetrachloride, and dichloroethane.

A saturated hydrocarbon compound or an aromatic hydrocarbon compound that is in a liquid state at ordinary temperature and has a boiling point on the order of 50 to 200° C. is preferably used as the inert organic solvent. Among them, one or more solvents selected from hexane, heptane, octane, ethylcyclohexane, mineral oil, toluene, xylene, and ethylbenzene are preferred.

Examples of the method for preparing the solid catalytic component (A) can include a preparation method which involves suspending the magnesium compound (a) and the electron-donating compound (c) in an inert organic solvent (e.g., an aromatic hydrocarbon compound having a boiling point of 50 to 150° C.) to form a suspension, and bringing a mixed solution formed from the titanium halogen compound (b) and an inert organic solvent (e.g., an aromatic hydrocarbon compound) into contact with the suspension, followed by reaction.

Another example of the method for preparing the solid catalytic component (A) can include a preparation method which involves suspending the magnesium compound (a) in the titanium halogen compound (b) or an inert organic solvent (e.g., an aromatic hydrocarbon compound), and subsequently bringing the electron-donating compound (c) and optionally, the titanium halogen compound (b) into contact with the suspension, followed by reaction.

In the present preparation method, a spherical catalytic component having a sharp particle size distribution can be obtained by using a spherical magnesium compound as the magnesium compound (a). As a result, the solid catalytic component (A) can be obtained in a similar form. Likewise, a spherical solid catalytic component having a sharp particle size distribution can also be obtained, without the use of the spherical magnesium compound (a), by forming particles according to, for example, a so-called spray dry method of spraying and drying a solution or a suspension using a spraying apparatus.

In the case of preparing the solid catalytic component (A) by bringing the magnesium compound (a), the titanium halogen compound (b) and the electron-donating compound (c), and optionally, the polysiloxane, etc. into contact with each other, the contact of each component can be performed in an inert gas atmosphere.

Specifically, each component can be brought into contact with stirring in a container equipped with a stirrer under conditions free from moisture or the like in an inert gas atmosphere.

The contact temperature may fall within a relatively low temperature range around room temperature for simple contact followed by stirring and mixing or for dispersing or suspending followed by a modification treatment. For obtaining a product through reaction after the contact, a temperature range of 40 to 130° C. is preferred. In this case, it is preferred to perform the reaction with this temperature kept after the contact.

When the temperature is lower than 40° C., the reaction does not sufficiently proceed. As a result, the resulting solid catalytic component rarely exerts sufficient performance. When the temperature exceeds 130° C., the reaction is difficult to control, for example, because the solvent used evaporates significantly.

The reaction time is preferably 1 minute or longer, more preferably 10 minutes or longer, further preferably 30 minutes or longer.

The ratio of the amount of each component used in preparing the solid catalytic component (A) differs depending on a preparation method and can therefore be appropriately determined.

For preparing the solid catalytic component (A), it is preferred to bring 0.5 to 100 mol, more preferably 0.5 to 10 mol, further preferably 1 to 5 mol, of the titanium halogen compound (b) into contact per mol of the magnesium compound (a).

For preparing the catalytic component, it is preferred to bring 0.01 to 10 mol, more preferably 0.01 to 1 mol, further preferably 0.02 to 0.6 mol, of the electron-donating compound (c) into contact per mol of the magnesium compound (a).

For preparing the catalytic component, in the case of using the polysiloxane, it is preferred to bring the 0.01 to 100 g, more preferably 0.05 to 80 g, further preferably 1 to 50 g, of the polysiloxane into contact per mol of the magnesium compound (a).

The amount of the inert organic solvent (e.g., an aromatic hydrocarbon compound) used in preparing the catalytic component is preferably 0.001 to 500 mol, more preferably 0.001 to 70 mol, further preferably 0.005 to 50 mol, per mol of the magnesium compound (a).

In the method for producing a catalyst for olefin polymerization according to the present invention, the contents of the titanium atom, the magnesium atom, the halogen atom and the electron-donating compound constituting the solid catalytic component (A) are not particularly limited as long as the effects of the present invention can be exerted.

The solid catalytic component (A) contains preferably 1.0 to 10% by mass, more preferably 1.5 to 8% by mass, further preferably 1.5 to 5% by mass, of the titanium atom.

The solid catalytic component (A) contains preferably 10 to 70% by mass, more preferably 10 to 50% by mass, further preferably 15 to 40% by mass, still further preferably 15 to 25% by mass, of the magnesium atom.

The solid catalytic component (A) contains preferably 20 to 90% by mass, more preferably 30 to 85% by mass, further preferably 40 to 80% by mass, still further preferably 45 to 80% by mass, of the halogen atom.

The solid catalytic component (A) contains preferably 0.5 to 30% by mass in total, more preferably 1 to 25% by mass in total, further preferably 2 to 20% by mass in total, of the electron-donating compound (c).

In the present specification, the contents of the titanium atom and the magnesium atom contained in the solid catalytic component (A) mean values measured according to a method (redox titration) described in JIS 8311-1997 "Method for determination of titanium in titanium ores".

In the present specification, the content of the halogen atom constituting the solid catalytic component (A) of the present, invention means a value measured by a silver nitrate titration method of treating the solid catalytic component with a mixed solution of sulfuric acid and pure water to prepare an aqueous solution, then separating a predetermined amount therefrom, and titrating the halogen atom with a silver nitrate standard solution. The content of the electron donor compound means a value measured by hydrolyzing the solid catalyst, then extracting an internal electron donor using an aromatic solvent, and measuring this solution by a gas chromatography FID (flame ionization detector) method.

Particularly preferred examples of the method for preparing the solid catalytic component (A) can include a preparation method which involves first suspending the magnesium compound (a) in an aromatic hydrocarbon compound having a boiling point of 50 to 150° C., subsequently bringing the titanium halogen compound (b) into contact with the obtained suspension, performing a reaction treatment, bringing one or more electron-donating compounds (c) having no phthalic acid ester structure into contact at −20 to 130° C. before or after the contact of the titanium halogen compound (b) with the suspension, and optionally bringing the polysiloxane into contact therewith, followed by a reaction treatment.

For the preparation method, it is desirable to perform an aging reaction at a low temperature before or after the contact of the electron-donating compound (c).

In the method for producing a catalyst for olefin polymerization according to the present invention, the solid catalytic component (A), an organoaluminum compound (B) represented by the following general formula (I):

(I)

wherein $R^1$ is an alkyl group having 1 to 6 carbon atoms, Q is a hydrogen atom or a halogen atom, and p is a real number of $0<p\leq 3$,
and an external electron-donating compound (C) are brought into contact with each other.

In the organoaluminum compound represented by the general formula (I), $R^1$ is an alkyl group having 1 to 6 carbon atoms and can be a group selected from a methyl group, an ethyl group, a propyl group, an isopropyl group, a butyl group, an isobutyl group, a pentyl group, an isopentyl group, a hexyl group and an isohexyl group. An ethyl group or an isobutyl group is preferred.

In the organoaluminum compound represented by the general formula (I), Q is a hydrogen atom or a halogen atom and is preferably a hydrogen atom, a chlorine atom, or a bromine atom.

In the organoaluminum compound represented by the general formula (I), p is a real number of $0<p\leq 3$ and is preferably 2 or 3, more preferably 3.

Specific examples of such an organoaluminum compound (B) include triethyl aluminum, diethyl aluminum chloride, triisobutyl aluminum, diethyl aluminum bromide, and diethyl aluminum hydride. One or two or more thereof can be used. Triethyl aluminum and triisobutyl aluminum are preferred.

In the method for producing a catalyst for olefin polymerization according to the present invention, use of the organoaluminum compound represented by the general formula (I) is considered to improve the effect of the specific organoaluminum compound (B) on the electron-donating compound constituting the solid catalytic component (A) so that the solid catalytic component can be optimally activated. Hence, the resulting catalyst is considered to exhibit excellent catalytic activity in a polymerization treatment and permit production of a polymer excellent in stereoregularity, melt flowability, etc., even when the polymerization catalyst is prepared in an inert gas atmosphere by using the solid catalytic component (A) comprising an electron-donating compound other than a phthalic acid ester.

In the method for producing a catalyst for olefin polymerization according to the present invention, examples of the external electron-donating compound (C) can include those similar to the aforementioned examples of the electron-donating compound (c) constituting the solid catalytic component (A). Among them, one or more compounds selected from a carbonate, an ether, an ester and an organosilicon compound are preferred.

When the external electron-donating compound is a carbonate, the carbonate is preferably one or more compounds selected from 2-ethoxyethyl phenyl carbonate, 2-benzyloxy ethyl phenyl carbonate and 2-ethoxyethyl-1-methyl carbonate.

When the external electron-donating compound is an ether, the ether is preferably 1,3-diether, particularly preferably one or more compounds selected from 9,9-bis (methoxymethyl)fluorene and 2-isopropyl-2-isopentyl-1,3-dimethoxypropane.

When the external electron-donating compound is an ester, the ester is preferably one or more compounds selected from methyl benzoate and ethyl benzoate.

When the external electron-donating compound is an organosilicon compound, one or more compounds selected from an organosilicon compound containing a Si—O—C bond and an organosilicon compound containing a Si—N—C bond are preferred.

Examples of the organosilicon compound include compounds represented by the following general formula (II):

(II)

wherein r and s are each independently an integer of 0 to 4; r+s is an integer of 0 to 4; $R^3$, $R^4$ or $R^5$ is a hydrogen atom or any group selected from a linear alkyl group having 1 to 12 carbon atoms, a branched alkyl group having 3 to 12 carbon atoms, a vinyl group, an allyl group, a substituted or unsubstituted cycloalkyl group, a phenyl group and an aralkyl group and optionally contains a heteroatom, they are the same with or different from each other, or $R^4$ and $R^5$ are optionally bonded to form a ring, and $R^3$, $R^4$ and $R^5$ are the same or different; and $R^6$ is any group selected from an alkyl group having 1 to 4 carbon atoms, a vinyl group, an allyl group, a cycloalkyl group having 3 to 12 carbon atoms, a phenyl group having 6 to 12 carbon atoms and an aralkyl group and optionally contains a heteroatom.

In the general formula (II), $R^3$ is preferably a linear alkyl group having 1 to 10 carbon atoms, a branched alkyl group having 3 to 10 carbon atoms, or a cycloalkyl group having 5 to 8 carbon atoms, particularly preferably a linear alkyl group having 1 to 8 carbon atoms, a branched alkyl group having 3 to 8 carbon atoms, or a cycloalkyl group having 5 to 8 carbon atoms.

In the general formula (II), each of $R^4$ and $R^5$ is preferably a linear alkyl group having 1 to 10 carbon atoms, a branched alkyl group having 3 to 10 carbon atoms, or a cycloalkyl group having 5 to 8 carbon atoms, particularly preferably a linear alkyl group having 1 to 8 carbon atoms, a branched alkyl group having 3 to 8 carbon atoms, or a cycloalkyl group having 5 to 7 carbon atoms. $R^4$ and $R^5$ may be bonded to form a ring. In this case, examples of the ($NR^4R^5$) group forming the ring include a perhydroquinolino group and a perhydroisoquinolino group.

In the general formula (II), $R^6$ is any group selected from an alkyl group having 1 to 4 carbon atoms, a cycloalkyl group, a phenyl group, a vinyl group, an allyl group and an aralkyl group and is preferably a linear alkyl group having 1 to 6 carbon atoms, or a branched alkyl group having 3 to 6 carbon atoms, particularly preferably a linear alkyl group having 1 to 4 carbon atoms, or a branched alkyl group having 3 to 4 carbon atoms.

The external electron-donating compound represented by the general formula (II) can be one or more compounds selected from, for example, a phenylalkoxysilane, an alkylalkoxysilane, a phenylalkylalkoxysilane, a cycloalkylalkoxysilane, a cycloalkyl(alkyl)alkoxysilane, an (alkylamino)alkoxysilane, an alkyl(alkylamino)alkoxysilane, an alkyl (alkylamino)silane, and an alkylaminosilane and is specifically one or more compounds selected from, for example, phenyltrimethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, bis(ethylamino) dicyclohexylsilane, dicyclopentylbis(ethylamino)silane, bis (methylamino)(methylcyclopentylamino)methylsilane, diethylaminotriethoxysilane, bis(cyclohexylamino)dimethoxysilane, bis(perhydroisoquinolino)dimethoxysilane, bis (perhydroquinolino)dimethoxysilane, and ethyl(isoquinolino)dimethoxysilane. Among them, one or more compounds selected from, for example, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroquinolino) dimethoxysilane, bis(perhydroisoquinolino)dimethoxysilane, and diethylaminotriethoxysilane are preferably used.

These external electron-donating compounds (C) can be used alone or in combination of two or more.

In the present specification, the pre-contact means that the solid catalytic component (A), the organoaluminum compound (B) represented by the general formula (I) and the external electron-donating compound (C) are brought into contact with each other before contact with an olefin.

The atmosphere of the pre-contact is preferably an inert gas atmosphere. The inert gas can be one or more gases selected from, for example, nitrogen gas, helium gas, neon gas, argon gas, methane gas, ethane gas and propane gas and is preferably nitrogen gas or argon gas.

The pre-contact may be performed in the presence of an inert organic solvent. In this context, the inert organic solvent is used as a medium for reacting each component and is preferably one or more solvents selected from a chain saturated hydrocarbon and an alicyclic hydrocarbon.

Specifically, the inert organic solvent can be one or more solvents selected from, for example, saturated hydrocarbon compounds such as pentane, hexane, heptane, octane, nonane, decane, cyclohexane, methylcyclohexane, ethylcyclohexane, 1,2-diethylcyclohexane, methylcyclohexene, decalin, and mineral oil; aromatic hydrocarbon compounds such as benzene, toluene, xylene, and ethylbenzene; and halogenated hydrocarbon compounds such as o-dichlorobenzene, methylene chloride, 1,2-dichlorobenzene, carbon tetrachloride, and dichloroethane.

The inert organic solvent is preferably one or more solvents selected from aromatic hydrocarbon compounds that are in a liquid state at ordinary temperature and have a boiling point on the order of 50 to 200° C., specifically, hexane, heptane, octane, ethylcyclohexane, toluene, xylene, and ethylbenzene.

In the method for producing a catalyst for olefin polymerization according to the present invention, the contact amount of the organoaluminum compound (B) represented by the general formula (I) in the pre-contact is preferably 0.1 to 1000 mol, more preferably 1 to 800 mol, further preferably 20 to 600 mol, per mol of the titanium atom in the solid catalytic component (A).

In the method for producing a catalyst for olefin polymerization according to the present invention, the contact amount of the external electron-donating compound (C) in the pre-contact is preferably 0.005 to 1 mol, more preferably 0.08 to 0.5 mol, further preferably 0.01 to 0.3 mol, per mol of the organoaluminum compound (B) represented by the general formula (I).

In the method for producing a catalyst for olefin polymerization according to the present invention, the pre-contact treatment involves bringing the solid catalytic component (A), the organoaluminum compound (B) represented by the general formula (I) and the external electron-donating compound (C) into contact with each other at a temperature of lower than 15° C. for a time of 30 minutes or shorter in the absence of the olefin.

The contact temperature of the pre-contact is lower than 15° C. and is preferably −15 to 10° C., more preferably 0 to 10° C.

The contact time of the pre-contact is 30 minutes or shorter and is preferably 5 seconds to 20 minutes, more preferably 30 seconds to 15 minutes, further preferably 1 to 10 minutes.

Usually, the reaction proceeds rapidly upon contact of an organoaluminum compound as a promoter and an external electron-donating compound with a solid catalytic component to cause the elimination of an electron-donating compound constituting the solid catalytic component, the exchange of this electron-donating compound with the external electron-donating compound, and the activation of the solid catalytic component by the promoter organoaluminum compound. Particularly, in an inert gas atmosphere, the catalytic active site (titanium active site) is easily inactivated due to excessive reaction.

In the method for producing a catalyst for olefin polymerization according to the present invention, the pre-contact treatment at the contact temperature for the contact time as described above suppresses excessive reaction of the titanium active site in the solid catalytic component with the organoaluminum compound so that the inactivation of the catalytic active site can be effectively suppressed.

In the production method according to the present invention, the catalyst for olefin polymerization of interest can be prepared by the pre-contact treatment.

In the case of polymerizing an olefin using the catalyst for polymerization obtained by the production method according to the present invention, the catalyst for polymerization can be subjected to a polymerization treatment by isolating the catalyst for polymerization after the pre-contact treatment and bringing the isolated catalyst into contact with the olefin, or by directly bringing the catalyst for polymerization after the pre-contact treatment into contact with the olefin.

The olefin polymerization may be olefin homopolymerization or may be copolymerization which may be random copolymerization or may be block copolymerization.

The olefin can be one or more members selected from, for example, ethylene, propylene, 1-butene, 1-pentene, 4-methyl-1-pentene, and vinylcyclohexane and is particularly preferably propylene.

In the case of copolymerizing olefins, for example, copolymerizing propylene and an olefin other than propylene, the olefin to copolymerized with propylene can be one or more members selected from, for example, ethylene, 1-butene, 1-pentene, 4-methyl-1-pentene, and vinylcyclohexane and is particularly preferably ethylene or 1-butene.

In the case of copolymerizing propylene with an additional olefin, examples of the method therefor can include random copolymerization of polymerizing propylene and a small amount of ethylene as comonomers in one step, and so-called propylene-ethylene block copolymerization of performing homopolymerization of propylene in a first step (first polymerization vessel) and performing copolymerization of propylene and ethylene in a second step (second polymerization vessel) or more multiple steps (multiple polymerization vessels).

The olefin polymerization temperature is preferably room temperature or higher and 200° C. or lower, more preferably room temperature or higher and 100° C. or lower.

The olefin polymerization pressure is preferably 10 MPa or lower, more preferably 6 MPa or lower.

The olefin may be polymerized by a continuous polymerization method or may be polymerized by a batch polymerization method. The polymerization reaction may be performed in one step or may be performed two or more (multiple) steps.

In the case of performing the polymerization reaction of the olefin, the polymerization atmosphere, may be an inert gas atmosphere or any gas atmosphere of the olefin to be polymerized, such as propylene.

According to the present invention, a solid catalytic component (A) comprising a magnesium atom, a titanium atom, a halogen atom and an electron-donating compound having no phthalic acid ester structure, a specific organoaluminum compound (B) as a promoter, and an external electron-donating compound (C) are brought into contact with each other at a low temperature for a short time in the absence of an olefin, before contact with the olefin, in an inert gas atmosphere. This is considered to improve the effect of the specific organoaluminum compound (B) on the electron-donating compound (c) while suppressing the inactivation of the catalytic active site, so that the solid catalytic component can be optimally activated. Therefore, the present invention can provide a method for producing a catalyst for olefin polymerization which exhibits excellent catalytic activity in a polymerization treatment and permits production of a polymer excellent in stereoregularity, melt flowability, etc., even when the polymerization catalyst is prepared in an inert gas atmosphere by using a solid catalytic component comprising an electron-donating compound other than a phthalic acid ester.

EXAMPLES

Example 1

<Preparation of Solid Catalytic Component>

A round-bottomed flask (capacity: 500 ml) equipped with a stirrer was fully purged with nitrogen gas and charged with 20 g of diethoxy magnesium and 60 ml of toluene to obtain a diethoxy magnesium-containing suspension.

Subsequently, the diethoxy magnesium-containing suspension was added into a mixed solution of 50 ml of toluene and 40 ml of titanium tetrachloride placed in advance in a round-bottomed flask (capacity: 500 ml) equipped with a stirrer and fully purged with nitrogen gas, to prepare a suspension.

Subsequently, the obtained suspension was reacted at −6° C. for 1 hour. Then, 22.9 mmol of 2-isopropyl-2-isopentyl-1,3-dimethoxypropane was added thereto. After elevation of the temperature to 100° C., a reaction treatment was performed for 2 hours with stirring.

After the completion of the reaction, the supernatant was extracted and washed 4 times with 150 ml of toluene of 90° C. To the obtained reaction product, 20 ml of titanium tetrachloride and 100 ml of toluene were added, and the temperature was elevated to 100° C., followed by reaction for 15 minutes. This treatment was performed 4 times. Then, the reaction product was washed 6 times with 150 ml of n-heptane of 40° C. to obtain a solid catalytic component (solid catalytic component (A)).

After solid-liquid separation, the titanium content in the obtained solid catalytic component was measured and was consequently 3.2% by mass.

<Formation of Polymerization Catalyst (Pre-Contact) and Olefin Polymerization>

An autoclave (internal capacity: 2.0 l) equipped with a stirrer and fully purged with nitrogen gas was charged with 7 ml of n-heptane, 1.32 mmol of triethyl aluminum, 0.13 mmol of cyclohexylmethyldimethoxysilane (CMDMS) and 0.0026 mmol (in terms of a titanium atom) of the solid catalytic component (A1), and the internal temperature was kept at 10° C. for 3 minutes in a nitrogen atmosphere to form a catalyst for polymerization.

Subsequently, the autoclave was charged with 1.5 l of hydrogen gas and 1.4 l of liquid propylene and heated to 20° C., followed by pre-polymerization at the internal temperature of 20° C. for 5 minutes. Then, the autoclave was heated to 70° C., followed by a polymerization reaction at the internal temperature of 70° C. for 1 hour.

The polymerization activity in the reaction was determined by a method given below, and the melt flowability (MFR) and xylene solubles (XS) of the obtained polymer were measured by methods given below. The results are shown in Table 1.

<Polymerization Activity>

Polymerization activity (kg-PP/g-cat) which indicates (F) kg of the formed polymer per hour of the polymerization time per g of the solid catalytic component was calculated according to the following expression:

Polymerization activity (kg-PP/g-cat)=(F) kg of the formed polymer/g of the solid catalytic component/1 hour <Melt Flowability (MFR) of Polymer>

The melt flow rate (MFR) which indicates the melt flowability of the polymer was measured according to ASTM D238 and JIS K 7210.

\<Xylene Solubles (XS) of Polymer\>

A flask equipped with a stirring apparatus was charged with 4.0 g of the polymer (polypropylene) and 200 ml of p-xylene. The polymer was dissolved over 2 hours while the temperature of the p-xylene within the flask was kept at a temperature (137 to 138° C.) below the boiling point by setting the external temperature to a temperature (approximately 150° C.) equal to or higher than the boiling point of the xylene. Then, the solution temperature was cooled to 23° C. over 1 hour. Soluble components were separated from insoluble components by filtration. The solution of the soluble components was collected. The p-xylene was distilled off by heating and drying under reduced pressure. The obtained residue was used as xylene solubles (XS), and its mass was determined as a relative value (% by mass) to the polymer (polypropylene).

Example 2

Preparation of a solid catalytic component, formation of a polymerization catalyst and olefin polymerization were performed in the same way as in Example 1 except that in the formation of a polymerization catalyst (pre-contact), the internal temperature was kept at 10° C. for 20 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 1

Preparation of a solid catalytic component, formation of a polymerization catalyst and olefin polymerization were performed in the same way as in Example 1 except that in the formation of a polymerization catalyst (pre-contact), the internal temperature was kept at 15° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 2

Preparation of a solid catalytic component, formation of a polymerization catalyst and olefin polymerization were performed in the same way as in Example 1 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 3

Preparation of a solid catalytic component, formation of a polymerization catalyst and olefin polymerization were performed in the same way as in Example 1 except that in the formation of a polymerization catalyst (pre-contact), the internal temperature was kept at 35° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 4

Preparation of a solid catalytic component, formation of a polymerization catalyst and olefin polymerization were performed in the same way as in Example 1 except that in the formation of a polymerization catalyst (pre-contact), the internal temperature was kept at 10° C. for 60 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 3

Preparation of a solid catalytic component, formation of a polymerization catalyst and olefin polymerization were performed in the same way as in Example 1 except that: 22.9 mmol of 5-t-butyl-1,2-phenylene diethyl carbonate was added instead of 22.9 mmol of 2-isopropyl-2-isopentyl-1,3-dimethoxypropane; and in the formation of a polymerization catalyst (pre-contact), the internal temperature was kept at 5° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 4

Preparation of a solid catalytic component, formation of a polymerization catalyst and olefin polymerization were performed in the same way as in Example 1 except that 22.9 mmol of diethyl 2,3-diisopropylsuccinate was used instead of 22.9 mmol of 2-isopropyl-2-isopentyl-1,3-dimethoxypropane.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 5

Preparation of a solid catalytic component, formation of a polymerization catalyst and olefin polymerization were performed in the same way as in Example 4 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 5

Preparation of a solid catalytic component, formation of a polymerization catalyst and olefin polymerization were performed in the same way as in Example 1 except that: 22.9 mmol of ethyl 3-ethoxy-2-t-butylpropionate was added instead of 22.9 mmol of 2-isopropyl-2-isopentyl-1,3-dimethoxypropane; and in the formation of a polymerization catalyst (pre-contact), the internal temperature was kept at 5° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 6

Preparation of a solid catalytic component, formation of a polymerization catalyst and olefin polymerization were performed in the same way as in Example 5 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 6

Preparation of a solid catalytic component, formation of a polymerization catalyst and olefin polymerization were performed in the same way as in Example 1 except that 22.9 mmol of 2-benzyloxy ethyl phenyl carbonate was used instead of 22.9 mmol of 2-isopropyl-2-isopentyl-1,3-dimethoxypropane.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 7

Preparation of a solid catalytic component, formation of a polymerization catalyst and olefin polymerization were performed in the same way as in Example 6 except that in the formation of a polymerization catalyst (pre-contact), the internal temperature was kept at 10° C. for 60 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 7

Preparation of a solid catalytic component, formation of a polymerization catalyst and olefin polymerization were performed in the same way as in Example 1 except that: 24 mmol of 2-ethoxyethyl-1-methyl carbonate and 6.0 mmol of 2-isopropyl-2-isopentyl-1,3-dimethoxypropane were added instead of 22.9 mmol of 2-isopropyl-2-isopentyl-1,3-dimethoxypropane; and in the formation of a polymerization catalyst (pre-contact), the internal temperature was kept at 4° C. for 6 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 8

Preparation of a solid catalytic component, formation of a polymerization catalyst and olefin polymerization were performed in the same way as in Example 7 except that in the formation of a polymerization catalyst (pre-contact), the internal temperature was kept at 10° C. for 3 minutes instead of 4° C. for 6 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 9

Preparation of a solid catalytic component, formation of a polymerization catalyst and olefin polymerization were performed in the same way as in Example 7 except that in the formation of a polymerization catalyst (pre-contact), the internal temperature was kept at 13° C. for 3 minutes instead of 4° C. for 6 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 10

Preparation of a solid catalytic component, formation of a polymerization catalyst and olefin polymerization were performed in the same way as in Example 7 except that in the formation of a polymerization catalyst (pre-contact), the internal temperature was kept at 10° C. for 20 minutes instead of 4° C. for 6 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 8

Preparation of a solid catalytic component, formation of a polymerization catalyst and olefin polymerization were performed in the same way as in Example 7 except that in the formation of a polymerization catalyst (pre-contact), the internal temperature was kept at 20° C. for 3 minutes instead of 4° C. for 6 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 9

Preparation of a solid catalytic component, formation of a polymerization catalyst and olefin polymerization were performed in the same way as in Example 7 except that in the formation of a polymerization catalyst (pre-contact), the internal temperature was kept at 34° C. for 3 minutes instead of 4° C. for 6 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 10

Preparation of a solid catalytic component, formation of a polymerization catalyst and olefin polymerization were performed in the same way as in Example 7 except that in the formation of a polymerization catalyst (pre-contact), the internal temperature was kept at 10° C. for 60 minutes instead of 4° C. for 6 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 11

Preparation of a solid catalytic component, formation of a polymerization catalyst and olefin polymerization were performed by the same treatment as in Example 1 except that 24 mmol of 2-ethoxyethyl-1-ethyl carbonate and 6.0 mmol of 2-isopropyl-2-isopentyl-1,3-dimethoxypropane were added instead of 22.9 mmol of 2-isopropyl-2-isopentyl-1,3-dimethoxypropane.

The polymerization activity in the reaction was measured in the same way as in Example 1, and the melt flowability (MFR) and xylene solubles (XS) of the obtained polymer were measured in the same way as in Example 1. The results are shown in Table 1.

Comparative Example 11

Preparation of a solid catalytic component, formation of a polymerization catalyst and olefin polymerization were performed in the same way as in Example 11 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 1.

Example 12

<Preparation of Solid Catalytic Component>

A solid catalytic component (solid catalytic, component (A2)) was obtained by the same treatment as in Example 1 except that 22.9 mmol of diethyl 1-cyclohexene-1,2-dicarboxylate was used instead of 22.9 mmol of 2-isopropyl-2-isopentyl-1,3-dimethoxypropane.

<Formation of Polymerization Catalyst (Pre-Contact) and Olefin Polymerization>

A polypropylene polymer was obtained by formation of a catalyst for polymerization (pre-contact) and a polymerization reaction in the same way as in Example 1 except that: the solid catalytic component (A2) was used instead of the solid catalytic component (A1), at the same mol thereas; and 0.13 mmol of diisopentyldimethoxysilane (DIPDMS) was used instead of 0.13 mmol of cyclohexylmethyldimethoxysilane (CMDMS).

The polymerization activity in the reaction was measured in the same way as in Example 1, and the melt flowability (MFR) and xylene solubles (XS) of the obtained polymer were measured in the same way as in Example 1. The results are shown in Table 2.

Comparative Example 12

Preparation of a solid catalytic component, formation of a polymerization catalyst and olefin polymerization were performed in the same way as in Example 12 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 2.

Example 13

A solid catalytic component (solid catalytic component (A3)) was obtained by the same treatment as in Example 1 except that 24 mmol of diethyl benzylidenemalonate and 6.0 mmol of 2-isopropyl-2-isopentyl-1,3-dimethoxypropane were added instead of 22.9 mmol of 2-isopropyl-2-isopentyl-1,3-dimethoxypropane.

<Formation of Polymerization Catalyst (Pre-Contact) and Olefin Polymerization>

A polypropylene polymer was obtained by formation of a catalyst for polymerization (pre-contact) and a polymerization reaction in the same way as in Example 1 except that: the solid catalytic component (A3) was used instead of the solid catalytic component (A1), at the same mol thereas; and 0.13 mmol of dicyclopentyldimethoxysilane (DCPDMS) was used instead of 0.13 mmol of cyclohexylmethyldimethoxysilane (CMDMS).

The polymerization activity in the reaction was measured in the same way as in Example 1, and the melt flowability (MFR) and xylene solubles (XS) of the obtained polymer were measured in the same way as in Example 1. The results are shown in Table 2.

Comparative Example 13

Preparation of a solid catalytic component, formation of a polymerization catalyst and olefin polymerization were performed in the same way as in Example 12 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 2.

Example 14

<Preparation of Solid Catalytic Component>

A solid catalytic component (solid catalytic component (A4)) was obtained by the same treatment as in Example 1 except that 7.5 mmol of 2-ethoxyethyl-1-ethyl carbonate and 22 mmol of dimethyl diisobutylmalonate were used instead of 22.9 mmol of 2-isopropyl-2-isopentyl-1,3-dimethoxypropane.

<Formation of Polymerization Catalyst (Pre-Contact) and Olefin Polymerization>

A polypropylene polymer was obtained by formation of a catalyst for polymerization (pre-contact) and a polymerization reaction in the same way as in Example 1 except that: the solid catalytic component (A4) was used instead of the solid catalytic component (A1), at the same mol thereas; and 0.13 mmol of diisopentyldimethoxysilane (DIPDMS) was used instead of 0.13 mmol of cyclohexylmethyldimethoxysilane (CMDMS).

The polymerization activity in the reaction was measured in the same way as in Example 1, and the melt flowability (MFR) and xylene solubles (XS) of the obtained polymer were measured in the same way as in Example 1. The results are shown in Table 2.

Comparative Example 14

Preparation of a solid catalytic component, formation of a polymerization catalyst and olefin polymerization were performed in the same way as in Example 14 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 2.

Comparative Example 15

Preparation of a solid catalytic component, formation of a polymerization catalyst and olefin polymerization were performed in the same way as in Example 14 except that in the formation of a polymerization catalyst (pre-contact), the internal temperature was kept at 34° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 2.

Comparative Example 16

Preparation of a solid catalytic component, formation of a polymerization catalyst and olefin polymerization were performed in the same way as in Example 14 except that in the formation of a polymerization catalyst (pre-contact), the internal temperature was kept at 10° C. for 60 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 2.

Example 15

Preparation of a solid catalytic component, formation of a polymerization catalyst and olefin polymerization were performed in the same way as in Example 1 except that 7.5 mmol of diethyl maleate and 22 mmol of dimethyl diisobutylmalonate were used instead of 22.9 mmol of 2-isopropyl-2-isopentyl-1,3-dimethoxypropane.

The polymerization activity in the reaction was measured in the same way as in Example 1, and the melt flowability (MFR) and xylene solubles (XS) of the obtained polymer were measured in the same way as in Example 1. The results are shown in Table 2.

Comparative Example 17

Preparation of a solid catalytic component, formation of a polymerization catalyst and olefin polymerization were performed in the same way as in Example 15 except that in the formation of a polymerization catalyst (pre-contact), the internal temperature was kept at 20° C. for 3 minutes instead of 10° C. for 3 minutes.

The polymerization activity in the reaction was measured in the same way as in Example 1, and the melt flowability (MFR) and xylene solubles (XS) of the obtained polymer were measured in the same way as in Example 1. The results are shown in Table 2.

TABLE 1

| | Electron-donating compound in solid catalytic component | Pre-contact condition Temperature (° C.) | Time (min) | External electron-donating compound | Polymerization activity [g/g] | Melt flowability (MFR) of polymer [g/10 min] | Xylene solubles (XS) of polymer [% by mass] |
|---|---|---|---|---|---|---|---|
| Example 1 | 2-Isopropyl-2-isopentyl-1,3-dimethoxypropane | 10 | 3 | CMDMS | 55,100 | 26.4 | 1.3 |
| Example 2 | | 10 | 20 | CMDMS | 46,700 | 24.0 | 1.4 |
| Comparative Example 1 | | 15 | 3 | CMDMS | 45,600 | 25.2 | 1.4 |
| Comparative Example 2 | | 20 | 3 | CMDMS | 36,100 | 24.0 | 1.4 |
| Comparative Example 3 | | 35 | 3 | CMDMS | 24,600 | 26.4 | 1.6 |
| Comparative Example 4 | | 10 | 60 | CMDMS | 35,700 | 28.8 | 1.6 |
| Example 3 | 5-t-Butyl-1,2-phenylene diethyl carbonate | 5 | 3 | CMDMS | 30,100 | 20.0 | 3.0 |
| Example 4 | Diethyl 2,3-diisopropylsuccinate | 10 | 3 | CMDMS | 31,900 | 4.0 | 2.2 |
| Comparative Example 5 | | 20 | 3 | CMDMS | 20,900 | 3.6 | 2.3 |

TABLE 1-continued

|  | Electron-donating compound in solid catalytic component | Pre-contact condition Temperature (° C.) | Time (min) | External electron-donating compound | Polymerization activity [g/g] | Melt flowability (MFR) of polymer [g/10 min] | Xylene solubles (XS) of polymer [% by mass] |
|---|---|---|---|---|---|---|---|
| Example 5 | Ethyl 3-ethoxy-2-t-butylpropionate | 5 | 3 | CMDMS | 46,000 | 10.7 | 2.1 |
| Comparative Example 6 |  | 20 | 3 | CMDMS | 33,900 | 9.7 | 2.0 |
| Example 6 | 2-Benzyloxy ethyl phenyl carbonate | 10 | 3 | CMDMS | 36,100 | 12.1 | 1.5 |
| Comparative Example 7 |  | 10 | 60 | CMDMS | 23,400 | 13.2 | 1.9 |
| Example 7 | 2-Ethoxyethyl-1-methyl carbonate + 2-isopropyl-2-isopentyl-1,3-dimethoxypropane | 4 | 6 | CMDMS | 35,800 | 10.0 | 1.5 |
| Example 8 |  | 10 | 3 | CMDMS | 39,100 | 11.0 | 1.4 |
| Example 9 |  | 13 | 3 | CMDMS | 33,300 | 10.0 | 1.4 |
| Example 10 |  | 10 | 20 | CMDMS | 33,100 | 10.0 | 1.5 |
| Comparative Example 8 |  | 20 | 3 | CMDMS | 25,600 | 10.0 | 1.5 |
| Comparative Example 9 |  | 34 | 3 | CMDMS | 17,500 | 11.0 | 1.7 |
| Comparative Example 10 |  | 10 | 60 | CMDMS | 25,300 | 12.0 | 1.7 |
| Example 11 | 2-Ethoxyethyl-1-ethyl carbonate + 2-isopropyl-2-isopentyl-1,3-dimethoxypropane | 10 | 3 | CMDMS | 44,300 | 11.0 | 1.2 |
| Comparative Example 11 |  | 20 | 3 | CMDMS | 29,000 | 10.0 | 1.2 |

TABLE 2

|  | Electron-donating compound in solid catalytic component | Pre-contact condition Temperature (° C.) | Time (min) | External electron-donating compound | Polymerization activity [g/g] | Melt flowability (MFR) of polymer [g/10 min] | Xylene solubles (XS) of polymer [% by mass] |
|---|---|---|---|---|---|---|---|
| Example 12 | Diethyl 1-cyclohexene-1,2-dicarboxylate | 10 | 3 | DIPDMS | 28,600 | 12.0 | 1.4 |
| Comparative Example 12 |  | 20 | 3 | DIPDMS | 18,700 | 11.0 | 1.5 |
| Example 13 | 2-Isopropyl-2-isopentyl-1,3-dimethoxypropane + diethyl benzylidenemalonate | 10 | 3 | DCPDMS | 38,300 | 15.4 | 1.5 |
| Comparative Example 13 |  | 20 | 3 | DCPDMS | 25,100 | 14.0 | 1.6 |
| Example 14 | Dimethyl diisobutylmalonate + 2-ethoxyethyl-1-ethyl carbonate | 10 | 3 | DIPDMS | 33,600 | 37.0 | 1.6 |
| Comparative Example 14 |  | 20 | 3 | DIPDMS | 29,900 | 47.0 | 1.8 |
| Comparative Example 15 |  | 34 | 3 | DIPDMS | 28,000 | 40.0 | 1.6 |
| Comparative Example 16 |  | 10 | 60 | DIPDMS | 16,600 | 26.0 | 1.9 |
| Example 15 | Dimethyl diisobutylmalonate + diethyl maleate | 10 | 3 | DIPDMS | 33,800 | 27.5 | 1.6 |
| Comparative Example 17 |  | 20 | 3 | DIPDMS | 22,100 | 25.0 | 1.7 |

As is evident from the results of Tables 1 to 3, the catalysts for olefin polymerization obtained in Examples 1 to 15 are prepared by performing a pre-contact treatment of bringing a solid catalytic component (A) comprising a magnesium atom, a titanium atom, a halogen atom and an electron-donating compound having no phthalic acid ester structure, a specific organoaluminum compound (B) as a promoter, and an external electron-donating compound (C) into contact with each other at a temperature of lower than 15° C. for a time of 30 minutes or shorter in the absence of the olefin, before contact with the olefin, and can therefore provide a method for producing a catalyst for olefin polymerization which exhibits excellent catalytic activity in a polymerization treatment and permits production of a polymer excellent in stereoregularity, melt flowability, etc., even when the polymerization catalyst is prepared in an inert gas atmosphere, in spite of using a solid catalytic component comprising an electron-donating compound other than a phthalic acid ester.

On the other hand, as is evident from the results of Table 1, the catalysts for olefin polymerization obtained using the solid catalytic components for olefin polymerization obtained in Comparative Examples 1 to 17 are inferior in polymerization activity in olefin polymerization, inferior in the melt flowability (MFR) of the polymer, or inferior in stereoregularity with low xylene solubles (XS) due to a contact temperature of 15° C. or higher in the pre-contact of bringing the solid catalytic component (A), the specific organoaluminum compound (B) as a promoter, and the external electron-donating compound (C) into contact with each other (Comparative Examples 1 to 3, 5, 6, 8, 9, 11 to 15, and 17) or a contact time exceeding 30 minutes in the pre-contact (Comparative Examples 4, 7, 10, and 16).

INDUSTRIAL APPLICABILITY

The present invention can provide a method for producing a catalyst for olefin polymerization which exhibits excellent catalytic activity in a polymerization treatment and permits production of a polymer excellent in stereoregularity, melt flowability, etc., even when the polymerization catalyst is prepared in an inert gas atmosphere by using a solid catalytic component comprising an electron-donating compound other than a phthalic acid ester.

The invention claimed is:

1. A method for forming a catalyst for olefin polymerization and copolymerizing olefins utilizing the catalyst, the method comprising:
   (1) forming a solid catalytic component (A) by bringing components consisting of a dialkoxy magnesium compound (a), a titanium halogen compound (b), an electron-donating compound (c) having no phthalic acid ester structure, and optionally a polysiloxane, into contact with each other; and
   forming the catalyst by performing a pre-contact treatment of bringing:
   the formed solid catalytic component (A),
   an organoaluminum compound (B) which is triethyl aluminum, and
   an external electron-donating compound (C)
   into contact with each other under an inert gas atmosphere at a temperature of 13° C. or lower for a time in a range from 5 seconds to 20 minutes in the absence of the olefin to produce the catalyst that is directly usable to catalyze olefin polymerization,
   wherein the dialkoxy magnesium compound (a) is diethoxy magnesium,
   wherein the titanium halogen compound (b) is titanium tetrachloride,
   wherein the electron-donating compound (c) having no phthalic acid ester structure is at least one compound selected from the group consisting of 2-benzyloxy ethyl phenyl carbonate, 2-ethoxyethyl-1-methyl carbonate, and 2-ethoxyethyl-1-ethyl carbonate,
   wherein the external electron-donating compound (C) is cyclohexylmethyldimethoxysilane; and
   (2) copolymerizing the olefins in a presence of the solid catalytic component (A),
   wherein the method is performed without washing the solid catalytic component (A) during and after the step (1).

2. The method according to claim 1, wherein the treatment temperature of the pre-contact treatment is −15° C. to 10° C.

3. The method according to claim 1, wherein in forming the solid catalyst component (A), the components consisting of the dialkoxy magnesium compound (a), the titanium halogen compound (b), the electron-donating compound (c) having no phthalic acid ester structure, and optionally the polysiloxane are allowed to react at a temperature of 40° C. to 130° C. after being brought into contact with each other.

4. The method according to claim 1, wherein the forming of the solid catalyst component (A) consists of:
   (i) suspending the magnesium compound (a) in an inert organic solvent to obtain a suspension,
   (ii) bringing the titanium halogen compound (b) into contact with the suspension,
   (iii) bringing the electron-donating compound (c) having no phthalic acid ester structure into contact with the suspension at a temperature of from −20° C. to 130° C., step (iii) being performed before or after step (ii) and
   (iv) optionally after step (iii), bringing the polysiloxane into contact with the magnesium compound (a), the titanium halogen compound (b), and the electron-donating compound (c).

5. The method according to claim 1, wherein the treatment time of the pre-contact treatment is 3 minutes or shorter.

* * * * *